Aug. 4, 1970 T. W. CLARK 3,522,743
LINK SPROCKET CHAIN
Filed March 7, 1968
FIG.1
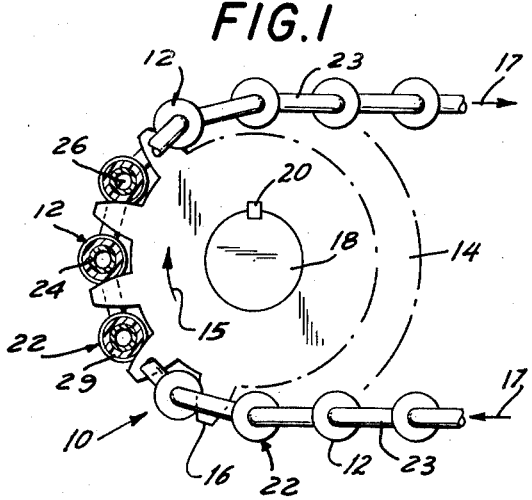
FIG.2
FIG.3
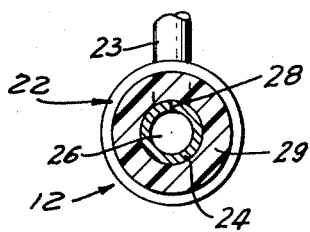
FIG.4
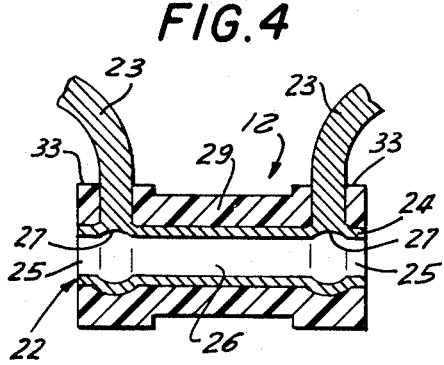
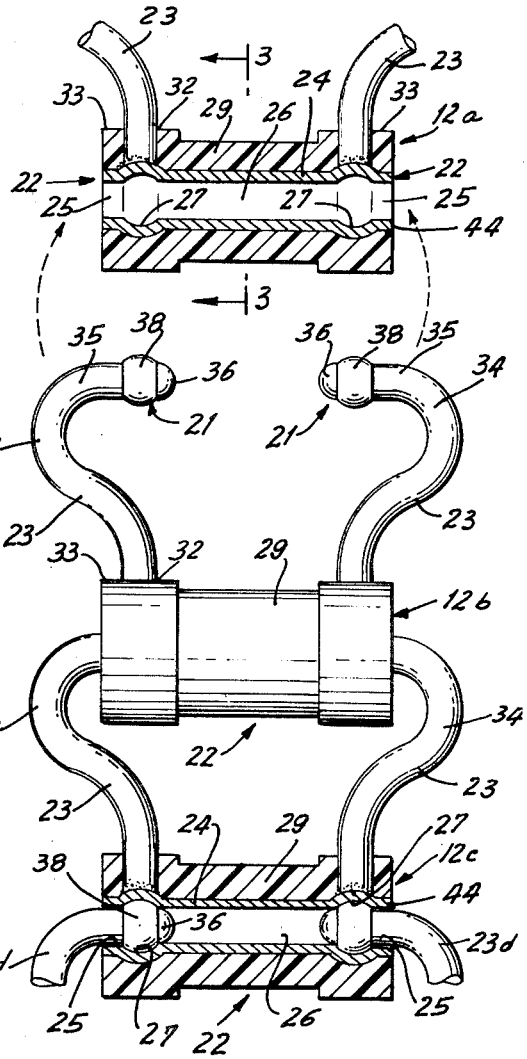
INVENTOR.
THOMAS W. CLARK
BY James and Franklin
ATTORNEYS

United States Patent Office 3,522,743
Patented Aug. 4, 1970

3,522,743
LINK SPROCKET CHAIN
Thomas W. Clark, Rockville Centre, N.Y., assignor to Pic Design Corp., East Rockaway, N.Y., a corporation of New York
Filed Mar. 7, 1968, Ser. No. 711,399
Int. Cl. F16g 13/02
U.S. Cl. 74—249     21 Claims

ABSTRACT OF THE DISCLOSURE

A sprocket chain is formed from a plurality of detachably interconnected links. Each of the links includes a cross bar having end openings and a pair of spaced arms extending from said cross bar and having end portions adapted to be securely received within openings of an adjacent link preferably by snap engagement.

BACKGROUND OF THE INVENTION

The present invention relates to sprocket chains and particularly to an improved chain link designed for incorporation into a sprocket chain.

Sprocket chains find extensive use in the transmitting of motion between a driving mechanism and a driven object. Chains of this type are formed from a plurality of individual chain links. When one of the links is damaged the sprocket chain must be removed from the mechanism. A new chain may then be inserted into the mechanism or in the alternative, the damaged link may be removed from the chain and a new link inserted into the chain.

With sprocket chains of usual construction the time required to replace the damaged link with a new link and the resulting idle time of the mechanism is so great as to render it economically unfeasible to repair the damaged chain. Hence it is usual to replace the damaged chain. But this involves maintaining an inventory of chains, expensive at best and potentially disastrous if, through error, the inventory is permitted to become depleted.

Sprocket chains are often used in situations in which it becomes advantageous to be able to readily vary the length thereof. For example, in an engineering design laboratory, various test mechanisms may be developed, each of which requires the use of sprocket chains of different lengths. To maintain in the laboratory an inventory of a great number of chains of different lengths, just so that the right one will be ready when needed, is clearly a costly and cumbersome procedure. In this circumstance, it is far preferable to be able to use a single chain, the length of which may be readily altered to satisfy any dimensional requirements which may arise.

Chains have been provided which are formed of a plurality of interconnected chain links. However, known chain constructions have required the use of connector pins or the like to form a sturdy, secure and reliable interconnection between the links, particularly when used in apparatus in which the link elements are subjected to relatively great forces. Furthermore, the attachment and detachment of the links of known chains is often a cumbersome and time consuming operation requiring the use of special tools and equipment.

Another problem associated with the known sprocket chain constructions is the noise level generated by the contact between the sprocket wheel and the chain, and by the movement of the several chain parts into and out of engagement with one another as they are stressed and released from stress. In certain environments this noise level may become uncomfortably high.

It is, therefore, an object of the present invention to provide an improved link construction for incorporation into a continuous sprocket chain.

It is a further object of the present invention to provide an improved chain link construction for forming a chain, in which the individual links may be readily interconnected to form the chain.

It is a further object of the present invention to provide a chain link construction for use in a sprocket chain wherein the removal and/or insertion of individual links into the chain may be readily effected by hand without the need for connecting elements or additional tools or equipment.

It is an object of this invention to provide an improved sprocket chain construction wherein the length of the chain is readily alterable for any desired purpose, and which chain is sturdy and reliable in operation.

It is yet another object of the present invention to provide an improved sprocket chain construction wherein the secure retention of adjacent links is achieved by means of a secure, tight snap fitting engagement between elements of adjacent chain links.

It is still a further object of the present invention to provide a sprocket chain construction in which there is a reduction in the noise level generated in the use of the chain.

To these ends the present invention provides a link adapted to be detachably inserted into a sprocket chain, the link comprising a core body having openings formed at its ends. A pair of spaced arms extend from the body and includes end portions generally facing one another. The openings and the end portions of the arms are provided with cooperating means effective when the end portions of one link are received within the openings of an adjacent link to engage one another in a secure engagement and preferably a snap fit, thereby to interconnect the adjacent links.

In a preferred embodiment of this invention the openings have enlarged radial sections near each end of the body. The end portions of the arms are provided with enlarged radial portions which are adapted to be received within the enlarged radial sections to provide the aforesaid snap fitted engagement.

In another aspect of the present invention, the core body comprises an inner metal tubular sleeve defining a passageway between the end openings. A jacket, made of an elastomeric material such as polyurethane or rubber, surrounds the sleeve to provide the necessary support and rigidity to the core body. The jacket also serves to reduce the noise level generated by the contact of the sprocket wheel with the links of the sprocket chain. The arms are secured to the sleeve and project outwardly from the jacket at areas of relatively large radius of the jacket. The jacket thus serves to resiliently support the bases of the arms, thereby to prevent the arms from breaking or separating from the sleeve as a result of forces applied to the arms during operation of the chain.

In accord with a further aspect of the present invention a longitudinal slit is formed along the length of the sleeve to render the sleeve outwardly spreadable. In this manner, a secure, preferably snap fitting engagement is achieved between the arms and the openings, when the end portions of the arms are not non-resilient. In the event that the openings in the body are not provided with enlarged radial sections, the sleeve will have sufficient resiliency so as to securely receive the arms of an adjacent link in a press fit engagement.

In accordance with the above, and to such other objects as may hereinafter appear, the present invention relates to the construction and manner of use of a sprocket chain link as defined in the appended claims and as described in this specification, taken together with the accompanying drawing in which:

FIG. 1 is a side elevational view, partly broken away and in cross-section, illustrating the manner in which a sprocket chain formed of the chain links of the present invention engages the teeth of a sprocket wheel;

FIG. 2 is an enlarged view of a plurality of adjacent sprocket chain links of the present invention, two link bodies being cross-sectioned, the figure illustrating the manner in which each link is snap fitted into an adjacent link;

FIG. 3 is a cross-sectioned view taken along the line 3—3 of FIG. 2; and

FIG. 4 is a side cross-sectional view of a second embodiment of a chain link of the present invention.

A typical embodiment of the present invention is shown in FIGS. 1–3. A sprocket chain designated generally 10 is formed of a plurality of interconnected individual sprocket chain links 12. As is conventional, a sprocket wheel 14 rotating in the direction of the arrow 15 and having a plurality of substantially equally spaced sprocket teeth 16 arranged around its peripherally, engages the sprocket chain 10 in a known manner to move chain 10 in the direction of arrow 17. Sprocket wheel 14 is made fast on shaft 18 as by means of a securing pin 20.

As shown in FIGS. 2 and 3, link 12 comprises a cross bar or body 22 from which a pair of hooked arms 23 extend.

Body 22 is provided with openings 25 at either of its ends, the openings 25 being connected by an axial passageway 26. The hooked arms 23 are each provided with end portions, generally designated as 21, the end portions 21 of the arms 23 and the openings 25 each having cooperating means effective to reliably secure the end portions of the arms of one link within the openings 25 of an adjacent link preferably with snap action, in a manner more specifically described below.

Body 22 comprises an inner core or hollow metallic sleeve 24, the interior wall thereof defining the passageway 26 and the openings 25. As seen best in FIG. 2, openings 25 are each provided with enlarged radial sections 27 located slightly inwardly of either end thereof. A longitudinal slit 28 (FIG. 3) is provided along the entire length of sleeve 24 to render sleeve 24 radially resilient and outwardly spreadable.

A jacket 29 made of an elastomeric material such as polyurethane or rubber surrounds sleeve 24 to provide support to sleeve 24 and an increased rigidity to body 22.

In the embodiment illustrated in FIGS. 2 and 3, hooked arms 23 are secured to the outer surface of the sleeve 24 directly above the enlarged radial sections 27 in any appropriate manner, as by welding, and pass through the enlarged radial areas 33 of jacket 29 as at 32. Areas 33 provide an increased resilient support to the bases of arms 23, so that the arms are better able to withstand the forces encountered during the use of a sprocket chain 10, thus increasing the structural reliability of the link 12 by preventing the separation of the arms 23 from the sleeve 24.

Arms 23 each include an outward curved section 34 followed by an inward curved section 35 to define inwardly pointed hooks 36 which, as shown in FIG. 2, are substantially aligned and facing one another. Hooked arms 23 are preferably formed of a resilient metal so as ot permit the movement of the arms 23 toward and away from one another by the simple application of a suitable force on the curved portions 34. Hooks 36 are each provided with an enlarged radius portion 38, hook 36 and portion 38 comprising the end portion 21. The portion 38 may be integral with the arms 23, defined by a swaged metal band held in place in any appropriate manner, or it may be made of a resilient, radially distortable material such as rubber or plastic. In a preferred embodiment of this invention, portion 38 is formed by securely wrapping a band or strip of polyurethane about each hook 36 slightly inward from the ends thereof. The diameter of the enlarged radius portion 38 is substantially equal to the diameter of the enlarged radius sections 27 provided at openings 25.

The manner by which the adjacent sprocket chain links 12 are interconnected to form the chain 10 in accordance with this invention is best shown in FIG. 2. Three adjacent sprocket chain links generally designated as 12a, 12b, and 12c, as viewed from top to bottom, are shown, links 12b and 12c being interconnected with one another while links 12a and 12b are shown in their position just prior to their interconnection. Hooked arms 23d from another chain link adjacent to link 12a (not shown), are shown in their interconnected snap fitted position within chain link 12c.

To interconnect links 12a and 12b, the hooked arms 23 of link 12b are first pulled outwardly by hand or by other suitable means. Link 12b is then moved into position with respect to link 12a so that the hooks 36 of arms 23 of link 12b are in substantial registry with the openings 25 at either end of body 22 of link 12a. The outward force upon the arms 23 of link 12b is then released so that the hooks 36 of the arms 23 are urged inwardly into the openings 25 of link 12a. The enlarged radial portions 38 of the arms 23 are of sufficient resiliency and radially distortable so as to permit portions 38 to first pass through the reduced radius end 44 of opening 25, where the resilient portions 38 are slightly compressed. The enlarged radial portions 38 of the arms 23 are then received into the enlarged radial sections 27 where the compressed radial portions 38 expand thereby to produce a secure snap fit engagement between the end portions 21 of one link within the openings 25 of an adjacent link. The insertion of the portions 38 into the reduced radius end 44 may also produce a radial outward spreading of sleeve 24 due to the provision of slit 28 therein. Once portion 38 is received with radial section 27, the spread sleeve will be urged by jacket 29 to its original undistorted state thereby to increase the security of the snap fit engagement between end portions 21 and the openings 25.

This is shown best in chain link 12c wherein hooked arms 23d of the lower adjacent chain link (not shown), are snap fitted and thereby securely retained within chain link 12c. Where the enlarged radial portions 38 are provided by a strip of swaged metal, portion 38 will not be appreciably distorted during its insertion into opening 25. However, the spreading of the slit sleeve 24 will permit entry of portion 38 into the enlarged radial section 27 in a snap fitting engagement. In the absence of an enlarged radius portion such as 38 on end portion 21, a sufficiently secure engagement may be obtained by the release of the outwardly spread sleeve about the end portions 21 within opening 25.

To remove a chain link whenever desired as to shorten an existing chain or to replace a damaged link, an outward force is applied to the curved portions 34 of the arms 23 to overcome the retention of the arms 23 within the openings 25 of the adjacent chain link by overcoming the snap fit retention of the enlarged radial portions 38 of the arms 23 within the enlarged radial sections 27 of the openings 25.

In a further aspect of the present invention, the provision of the jacket 29 greatly reduces the noise level produced by the contact of the sprocket wheel teeth upon the sprocket chain 10 during the operation of the wheel and chain as shown in FIG. 1. A further reduction in the noise level results from the secure retention between the elements of the chain link of this invention, and the prevention of movement of the link elements into and out of engagement with one another under conditions of stress change.

The embodiment illustrated in FIG. 4 is substantially similar to that shown in FIG. 2 and 3 with the exception that the arms 23 are formed integral with the metallic sleeve 24. In other respects the construction of the chain link shown in FIG. 4, as well as its manner of interconnection with adjacent chain links to form a sprocket chain, is substantially the same as that of the embodiment illustrated in FIGS. 2 and 3.

The present invention, therefore, discloses an improved construction for a sprocket chain link for use in forming a sprocket chain of any desired length wherein the individual sprocket chain links may be snapped into and out of interconnecting engagement with adjacent links thereby to allow for ready variation of the chain length and to greatly facilitate the removal and replacement of any links which may become damaged during operation. The individual links engage one another in a secure and reliable connection, thereby to form a sprocket chain which provides reliable, long-lasting operation at reduced noise levels.

It will be understood that the embodiments described above have been disclosed merely for purposes of illustration, and that many variations may be made without departing from the spirit and scope of the invention as defined in the following claims.

I claim:

1. A link adapted to be detachably inserted into a sprocket chain or the like, said chain being formed from a plurality of said links interconnected with one another, said link comprising a body having openings extending thereinto from opposite ends thereof, a pair of spaced arms secured to and extending from said body in substantially the same direction, each of said arms having an end portion extending generally toward the other of said arms and of a size such as to be received within a said opening in an adjacent one of said links, thereby to interconnect said link to said other of said links, said openings and said arm end portions having cooperating means effective when the arm end portions of one link are received within the openings of an adjacent link to engage one another, thereby to prevent said end portions from escaping from said openings, said cooperating means comprising a first part on one of said openings and said arm end portions and a second part on the other of said openings and said arm end portions, said parts extending respectively in generally opposed directions relative to one another essentially perpendicularly to the axes of said arm end portions, the part on said arm end portion being located axially inwardly of said opening relative to the part on said opening engaged thereby.

2. The link of claim 1, in which said body comprises a core in which said openings are formed, and a jacket of an elastomeric material surrounding said core.

3. The link of claim 2, in which said arms, including said end portions thereof, extend outwardly and then inwardly as they extend from said body, thereby to define a pair of inwardly pointing hooks.

4. The link of claim 2, in which said body comprises a tubular sleeve the interior of which defines said opening.

5. The link of claim 4, in which said arm extends out from said sleeve adjacent to the ends thereof.

6. The link of claim 4, in which said arms, including said end portions thereof, extend outwardly and then inwardly as they project from said body, thereby to define a pair of inwardly pointed hooks.

7. The link of claim 2, in which said jacket is provided with an external groove located between areas of relatively greater radius than the area of said groove.

8. The link of claim 7, in which said arms extend out from said body at said areas of relatively greater radius.

9. The link of claim 8, in which said arms, including said end portions thereof, extend outwardly and then inwardly as they project from said body, thereby to define a pair of inwardly pointing hooks.

10. The link of claim 1, in which one of said parts is resiliently radially distortable, said parts thereby engaging one another with snap action.

11. A chain comprising a plurality of the links of claim 10, the arm end portions of said links being received in said openings of an adjacent link in a snap action engagement.

12. The link of claim 1, in which said second part is on said arm end portion and comprises a radially compressible element, said parts thereby engaging one another with snap action.

13. The link of claim 1, in which said first part is on said opening, said opening being defined by a wall having a slit therein extending generally in the direction of the length of said opening, thereby rendering said wall spreadable.

14. The link of claim 1, in which said body comprises a tubular sleeve the interior of which defines said openings.

15. The link of claim 14, in which said arms extend out from said sleeve adjacent to the ends thereof.

16. The link of claim 1, in which said body comprises a tubular sleeve the interior of which defines said opening.

17. The link of claim 16, in which said arms, including said end portions thereof, extend outwardly and then inwardly as they project from said body, thereby to define a pair of inwardly pointing hooks.

18. The link of claim 1, in which said body comprises a jacket provided with an external groove between areas of relatively greater radius than the area of said groove, said arms extending from said body through said jacket at said areas of relatively greater radius.

19. The link of claim 18, in which said arms including said end portions thereof extend outwardly and then inwardly as they project from said body, thereby to define a pair of inwardly pointing hooks.

20. The link of claim 1, in which said arms, including said end portions thereof, extend outwardly and then inwardly as they project from said body, thereby to define a pair of inwardly pointing hooks.

21. A chain comprising a plurality of the links of claim 1, the arm end portions of said links being received in said openings respectively of an adjacent link.

References Cited

UNITED STATES PATENTS

| 188,209 | 3/1877 | Tuttle | 74—248 |
| 490,110 | 3/1893 | Maxon | 74—249 |
| 955,377 | 4/1910 | Brisse | 74—245 |
| 3,138,236 | 6/1964 | Goodgame. | |

JAMES A. WONG, Primary Examiner

U.S. Cl. X.R.

74—252